Oct. 21, 1930.  F. N. BARD  1,778,746
SELF LUBRICATING VALVE
Filed Aug. 20, 1926
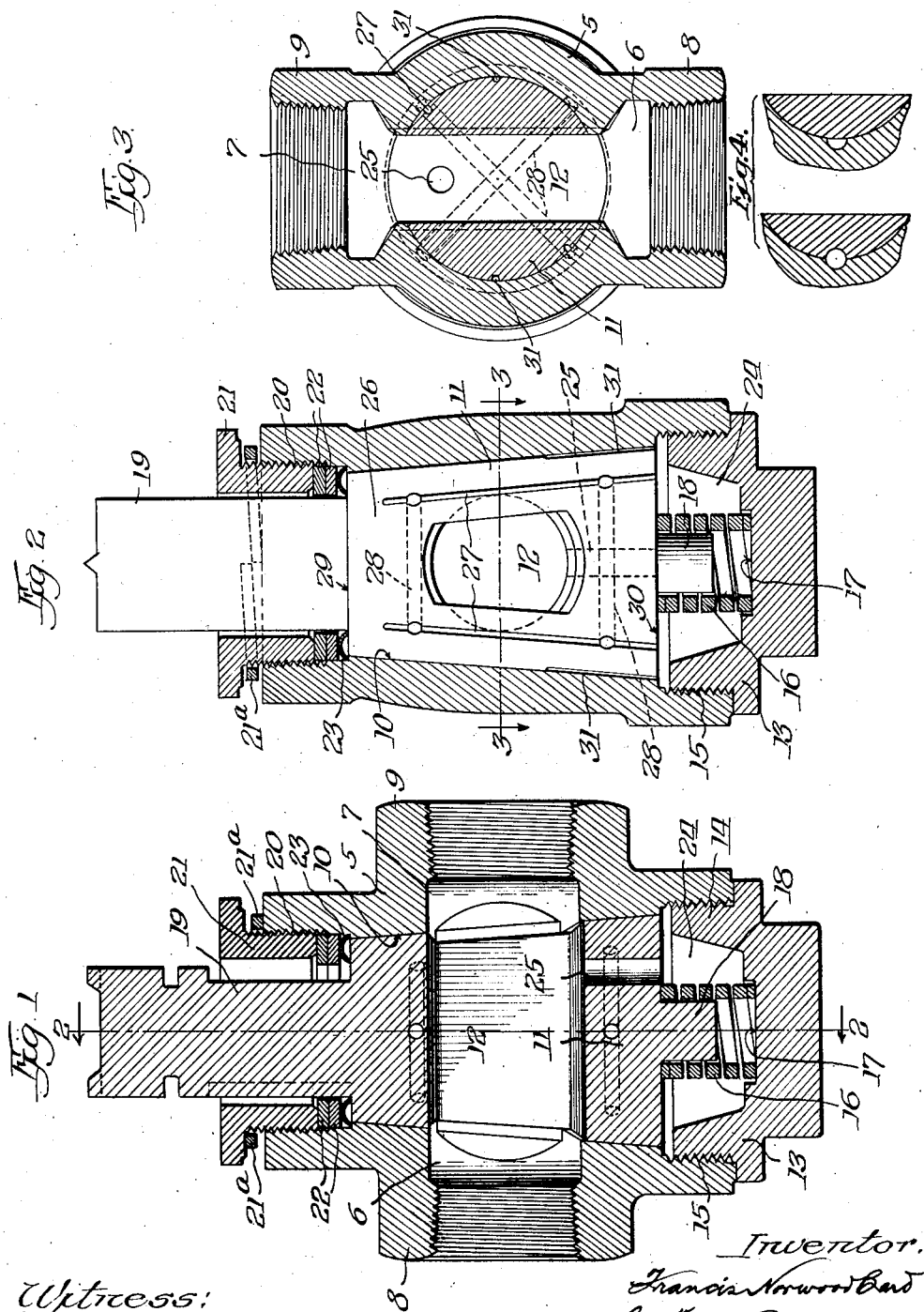
Inventor:
Francis Norwood Bard
by attorney
Paine Carpenter
Witness:

Patented Oct. 21, 1930

1,778,746

UNITED STATES PATENT OFFICE

FRANCIS NORWOOD BARD, OF HIGHLAND PARK, ILLINOIS

SELF-LUBRICATING VALVE

Application filed August 20, 1926. Serial No. 130,365.

This invention relates in general to valves, and, more particularly, to plug valves, and in the specific instance here relates to improved plug valve having self lubricating means.

While this invention is shown described as applied to a plug valve it will be understood that it finds utility in connection with other types of valves.

The principal objects and advantages which characterize this invention reside in the provision of an improved type of plug valve; the provision of an improved type of self lubricating valve; the provision of an improved plug valve having improved means for lubricating the same; the provision of a valve adapted to conduct a lubricant and incorporating means in the valve structure for conducting a lubricant to the moving parts of the valve for facilitating movement of the valve on its seat; and the provision of a valve of the character referred to which is relatively simple in construction, that is, it includes a relatively limited number of moving parts and one in which the conducting surface of the valve and seat are constantly supplied with a lubricant.

The foregoing and such other objects and advantages as may appear or be pointed out as this description proceeds are attained in the structural movement illustrated in the accompanying drawing in which:

Figure 1 is a vertical sectional view of a plug valve constructed in accordance with this invention;

Figure 2 is a vertical sectional view taken on the line 2—2 of Figure 1 looking in the direction indicated by the arrows.

Figure 3 is a transverse sectional view taken on the line 3—3 looking in the direction indicated by the arrows, and Figure 4, is a composite view of alternative arrangements of the grooves for conducting lubricant.

Referring now more particularly to the drawing, 5 designates the body of the valve, in the present instance being provided with a transverse passageway formed by the ports 6 and 7 which are formed in the valve body and in lateral extensions 8 and 9, the latter being internally threaded, as shown in Figure 1, for connection to the opposite portions of a conduit not shown.

The valve body is provided with a valve seat 10, generally tapering, that is, frustoconical in shape, and having its axis expanding transversely of the axis of the ports 6 and 7.

I find it convenient, in the present type of valve, to introduce the valve member 11 from one end of the valve, this valve member being complementally conical in shape so as to substantially coincide to the shape of the seat 10, the valve member having a transverse passageway 12 which when brought into registration with the ports 6 and 7 will conduct fluid through the valve. The valve member, as stated above, is introduced through the lower open end of the body 5 and, this end is closed by a cap member 13 having a threaded portion 14 engaging with threads 15 on the inner surface of the body adjacent the point at which said plug is inserted.

The valve is maintained against its seat by the provision of a helical spring 16 engaging a recess 17 in the cap 13 and also engaging a lug or projection 18 on the adjacent end of the valve member.

The valve member is provided with a valve stem 19 which projects beyond one end of the body 5 through an opening therein internally threaded as at 20 to receive a gland member 21. The gland member 21 bears upon packing elements 22, 22 and these elements, in turn, bear upon a spring member 23 which tends to balance the action of the spring 16 and while not forcing the valve off its seat, still serving to facilitate the rotation of the valve on its seat.

The cap member 13 forms a pocket 24 adjacent to the larger end of the valve member 11 and this pocket 24 communicates, by means of a passageway 25, with the passageway 12 in the valve. The pocket 24 further communicates with the conical face 26 of the valve member 11 and with the valve seat 10 by the provision of grooves 27 formed in the face of the valve, said grooves being interconnected by transverse passageways 28 formed in the valve member 11 above and below the passageway 12.

The grooves 27 terminate short of the upper end 29 of the valve member 11 but extend entirely down to the lower end 30 of the valve member so as to establish communication with the pocket 24.

In order to further facilitate communication of the valve face with the pocket 24, auxiliary grooves 31, 31 are provided.

It will be obvious (see Figure 4) that the grooves 27 may, if desired, be formed in the valve seat as well as in the valve member, and it is pointed out that in some instances the grooves may be made half in the valve seat and half in the valve member.

In order to prevent the gland 21 from backing off, a spring lock washer 21ª is interposed between said gland and adjacent portion of the valve body 5.

The valve of this invention is employed in a pipe line conducting lubricating oil, grease or the like, in fact, any fluid which possesses lubricating properties or carries in it a lubricant. It will be understood that the lubricant flowing in the valve will, in part, be conducted to the pocket 24 and under the pressure of the lubricant contained in the pipe line the lubricant in said pocket will be forced upwardly through the grooves 27 and thus between the surface of the valve and the valve seat, thereby lubricating the same. In addition to this function, the pressure of the lubricant in the pocket 24 will, in some degree, tend to force the valve against its seat and therefore, while still maintaining a volume of lubricant between the valve and its seat, cause the valve to engage the seat with sufficient pressure to prevent leakage.

Having thus described my invention and illustrated its use, what I claim as new and desire to secure by Letters Patent is:

In a plug valve, a casing having a tapered valve seat provided with fluid passageways and a tapered plug member engaging said seat and provided with a hole adapted to register with said passageways, said plug valve member having a stem projecting from the smaller end thereof, a chamber at the larger end of said valve in communication with the hole in said valve to permit fluid in the pipe line to enter beneath the larger end of the valve, a spring member tending to hold said valve on its seat arranged in said chamber, said stem with said smaller end of said valve forming an annular shoulder, a complemental shoulder on the valve casing, an annular compression member having spaced yielding portions engaging said shoulders, a gland for applying pressure to said compression member to tend to hold said valve off its seat, said compression member and said spring in said chamber cooperating for tending to balance the valve and prevent jamming of the same in its seat due to pressure in the pipe line.

In testimony whereof, I have hereunto signed my name.

FRANCIS NORWOOD BARD.